(12) United States Patent
Figueira et al.

(10) Patent No.: US 9,264,354 B2
(45) Date of Patent: *Feb. 16, 2016

(54) MAPPING PBT AND PBB-TE TRAFFIC TO VPLS AND OTHER SERVICES

(71) Applicant: Brixham Solutions Ltd., Tortola (VG)

(72) Inventors: Norival R. Figueira, Campbell, CA (US); Fong Liaw, San Jose, CA (US); Richard D. Gitlin, Little Silver, NJ (US)

(73) Assignee: BRIXHAM SOLUTIONS LTD., Tortola (VG)

( * ) Notice: Subject to any disclaimer, the term of this patent is extended or adjusted under 35 U.S.C. 154(b) by 89 days.

This patent is subject to a terminal disclaimer.

(21) Appl. No.: 14/050,067

(22) Filed: Oct. 9, 2013

(65) Prior Publication Data

US 2014/0071989 A1    Mar. 13, 2014

Related U.S. Application Data

(63) Continuation of application No. 12/009,833, filed on Jan. 22, 2008, now Pat. No. 8,619,784.

(60) Provisional application No. 60/897,778, filed on Jan. 25, 2007.

(51) Int. Cl.
*H04L 12/741* (2013.01)
*H04L 12/46* (2006.01)

(52) U.S. Cl.
CPC ............. *H04L 45/74* (2013.01); *H04L 12/462* (2013.01); *H04L 12/4654* (2013.01); *H04L 12/4658* (2013.01); *H04L 12/4662* (2013.01)

(58) Field of Classification Search
None
See application file for complete search history.

(56) References Cited

U.S. PATENT DOCUMENTS

| | | | |
|---|---|---|---|
| 7,688,756 B2 | 3/2010 | Allan et al. | |
| 8,619,784 B2 * | 12/2013 | Figueira et al. | 370/395.3 |
| 2004/0037279 A1 | 2/2004 | Zelig et al. | |
| 2004/0042454 A1 | 3/2004 | Zabihi et al. | |
| 2004/0081171 A1 | 4/2004 | Finn et al. | |
| 2004/0170173 A1 | 9/2004 | Pan et al. | |
| 2005/0013297 A1 | 1/2005 | Eriksson | |
| 2005/0044262 A1 | 2/2005 | Luo et al. | |
| 2005/0169270 A1 | 8/2005 | Mutou et al. | |
| 2006/0029032 A1 | 2/2006 | Allan et al. | |
| 2006/0047851 A1 | 3/2006 | Voit et al. | |
| 2006/0187950 A1 | 8/2006 | Bou-Diab et al. | |
| 2006/0245436 A1 | 11/2006 | Sajassi | |
| 2006/0280192 A1 | 12/2006 | Desanti et al. | |
| 2007/0008982 A1 | 1/2007 | Voit et al. | |

(Continued)

OTHER PUBLICATIONS

Sajassi, et al. "VPLS Interoperability with Provider Backbone Bridges", Internet Working Group Internet Draft, Mar. 2007, 23 pages.

(Continued)

*Primary Examiner* — Benjamin H Elliott, IV
(74) *Attorney, Agent, or Firm* — Amin, Turocy & Watson, LLP

(57) ABSTRACT

Transferring data in a network is disclosed. Transferring includes receiving a Provider Backbone Transport (PBT) frame, identifying a plurality of location specific identifiers in the PBT frame, mapping the PBT frame to a service based at least in part on the plurality of location specific identifiers, formatting the PBT frame according to the service to obtain a service frame, and transferring the service frame to a network associated with the service.

20 Claims, 9 Drawing Sheets

(56) References Cited

U.S. PATENT DOCUMENTS

| | | | |
|---|---|---|---|
| 2007/0076719 A1* | 4/2007 | Allan | H04L 12/4662 370/392 |
| 2007/0086361 A1 | 4/2007 | Allan et al. | |
| 2008/0101390 A1 | 5/2008 | Hu et al. | |
| 2008/0172497 A1* | 7/2008 | Mohan et al. | 709/249 |
| 2008/0212595 A1 | 9/2008 | Figueira et al. | |
| 2008/0219268 A1 | 9/2008 | Dennison et al. | |
| 2008/0279196 A1 | 11/2008 | Friskney et al. | |
| 2014/0071989 A1* | 3/2014 | Figueira et al. | 370/392 |

OTHER PUBLICATIONS

Office Action dated Oct. 14, 2009 for U.S. Appl. No. 12/009,833, 30 pages.

Allan, et al. "Provider Link State Bridging", IEEE Communications Magazine; Sep. 2008, 8 pages.

Office Action dated Mar. 18, 2010 for U.S. Appl. No. 12/009,833, 16 pages.

Office Action dated Aug. 3, 2010 for U.S. Appl. No. 12/009,833, 18 pages.

Imtech. "Welcome to Imtech Telecom—Future Networks", published online at [http://www.imtechtele.com/content/news/events/futurenetworks_event/Future_Networks retrieved Oct. 9, 2007, 1 page.

Belcher, Adrian, "The Merits of Metro/Carrier Ethernet Transport Technologies", World Wide Packets, Mar. 8, 2007, 6 pages.

Bottorff et al., "Provider Backbone Transport", Nortel, published online at [http://www.ieee802.org/1/files/public/docs2006/ah-bottorff-pbt4ieee-v2-0706.pdf], Jul. 2006, 13 pages.

Office Action dated Mar. 15, 2011 for U.S. Appl. No. 12/009,833, 16 pages.

Office Action dated Jan. 30, 2012 for U.S. Appl. No. 12/009,833, 25 pages.

* cited by examiner

400

| I-SID | C-VID | S-VID | PW ID | Service |
|---|---|---|---|---|
| 100 | * | * | * | VPLS 6 |
| 101 | 10 | * | * | EVPL 7 |
| 101 | 11 | * | * | PBT 12 |
| 115 | * | * | 12 | VPLS 2 |
|  |  |  |  |  |

FIG. 4

Example: PBT Inter-Carrier Interconnect (ICI)

- The PBT Inter-Carrier Interconnect (ICI) function is used to interconnect PBT trunks from different carriers
- PBT trunks are terminated on both sides
- The payload from one PBT trunk is mapped to another PBT trunk
- Payload switching can be provided PBBN: Provider Backbone Bridge Network

MAPPING PBT AND PBB-TE TRAFFIC TO VPLS AND OTHER SERVICES

CROSS REFERENCE TO OTHER APPLICATIONS

This application is a continuation of U.S. patent application Ser. No. 12/009,833, filed Jan. 22, 2008 and entitled "MAPPING PBT AND PBB-TE TRAFFIC TO VPLS AND OTHER SERVICES", which claims priority to U.S. Provisional Application No. 60/897,778, filed Jan. 25, 2007 and entitled "Mapping PBT traffic to VPLS and other services", the entireties of which are incorporated herein by reference.

BACKGROUND OF THE INVENTION

Provider Backbone Bridges (PBB) are being defined by the IEEE 802.1ah project to allow scaling of provider networks to $2^{24}$ (i.e., up to 16 million) "Service Virtual VLANs". IEEE 802.1ah adds the following fields to Ethernet frames transported through the PBBN (PBB Network):

B-DA: Backbone destination MAC address
B-SA: Backbone source MAC address
B-TAG: Backbone VLAN tag, which carries a backbone VLAN ID (B-VID)
I-TAG: Service Instance Tag, which contains a service instance ID (I-SID) identifying a service customer.

IEEE 802.1ah specifies the Provider Bridge (802.1ad) interface to a PBBN in terms of the operation and configuration of these fields.

IEEE 802.1ah is also called MAC-in-MAC, since it keeps the original Ethernet frame and adds a new destination and source MAC addresses around the frame.

Provider Backbone Transport (PBT) is a variation on PBB that allows carriers to provision engineered and protected point-to-point service instances. PBT is intended to make Ethernet point-to-point transport more attractive to operators that are used to SONET/SDH networking, potentially positioning PBT Ethernet systems as a longer-term replacement for SONET/SDH.

PBT operates by adding configured routes to a PBBN. Each PBT trunk forwards on a 60 bit field composed of the B-VID and B-DA fields, and is identified by a 12 bit VLAN ID (B-VID) and a 96 bit source/destination address pair (B-DA, B-SA). A source of a PBT Trunk is identified by the B-SA and the destination of a PBT trunk is identified by the B-DA.

The interworking of PBT with services such as VPLS (Virtual Private LAN Service), EVPL (Ethernet Virtual Private Line), egress PBT trunks, connection to a Private IP network, connection to a Public IP Network (i.e., Internet), etc. is currently limited and improvements would be desirable.

BRIEF DESCRIPTION OF THE DRAWINGS

Various embodiments of the invention are disclosed in the following detailed description and the accompanying drawings.

FIG. 4 is an example of a PBT-service lookup table. PBT-service lookup table 400 is an example of PBT-service lookup table 316.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
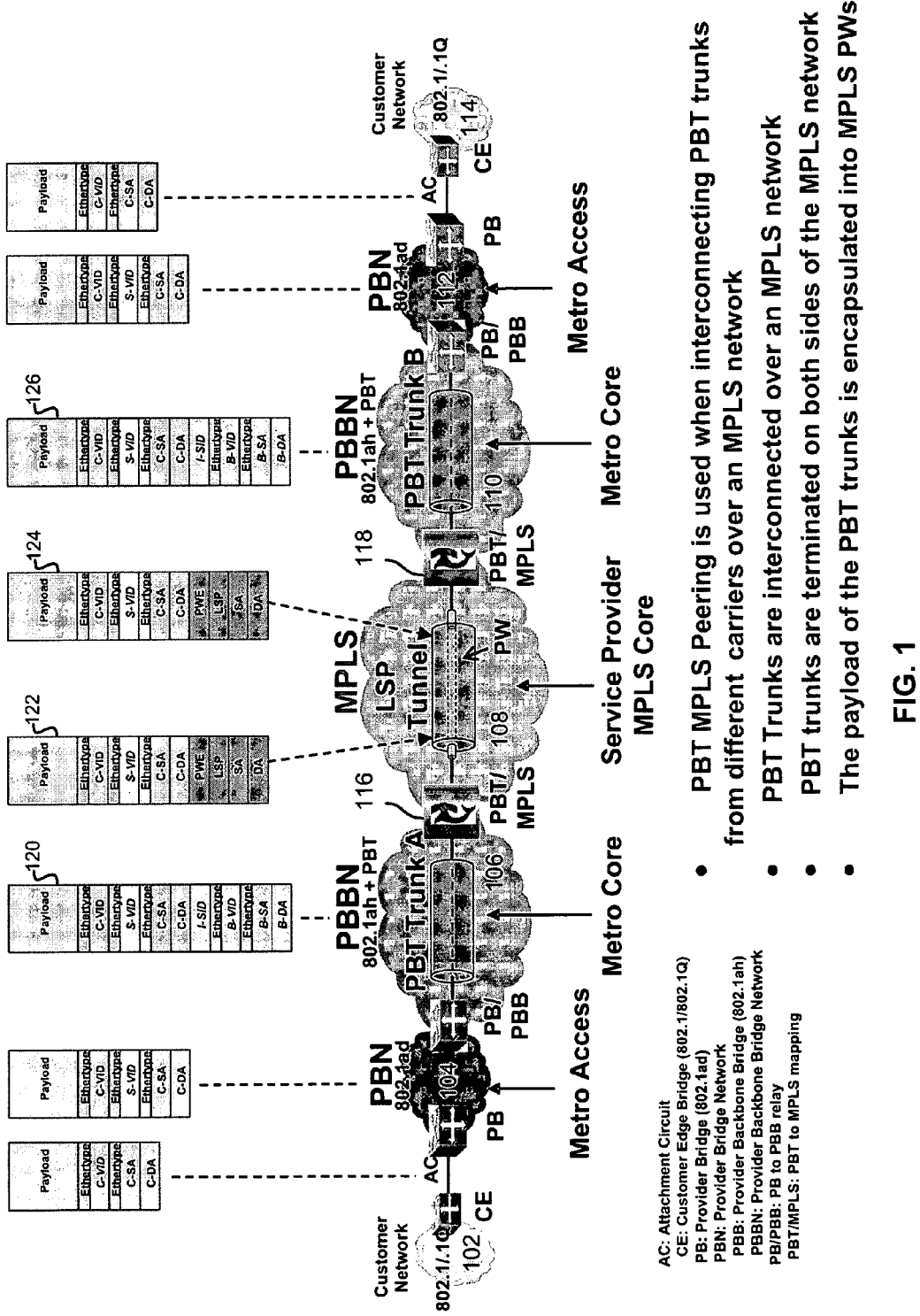
FIG. 1 is a diagram illustrating an example of a PBBN network interfacing with a Multiprotocol Label Switching (MPLS) network.

FIG. 1 is a diagram illustrating an example of a PBBN network interfacing with a Multiprotocol Label Switching (MPLS) network.

The following is a list of acronyms that may be used herein:
PBT: Provider Backbone Transport
PBB-TE: Provider Backbone Bridge Traffic Engineering
B-DA: Backbone destination MAC address
B-SA: Backbone source MAC address
B-Tag: Backbone VLAN tag
B-VID: Backbone VLAN ID carried in the B-TAG
I-Tag: Service Instance Tag
I-SID: Service Instance ID, which identifies a service flow or customer. The 1-SID is carried in the I-Tag PBT is a term originally created by Nortel. The IEEE has created a project to standardize PBT technology under the name PBB-TE (Provider Backbone Bridge Traffic Engineering) in IEEE 802.1Qay. In some embodiments, there is no difference between PBT and PBB-TE technologies, except that the former may refer to a pre-standard implementation while the latter refers to an implementation that conforms to 802.1Qay. As used herein, PBT (i.e., pre-standard version of the technology) includes PBB-TE (the standard version of the technology), and the terms PBT and PBB-TE may be used interchangeably.

In the example shown, traffic is transferred from customer network 102 to PBN (metro access) 104 to PBBN (metro core) 106 to MPLS network (service provider MPLS core) 108 to PBBN (metro core) 110 to PBN (metro access 112) to customer network 114. Provider edge device 116 interfaces with PBBN 106 and MPLS 108 and provider edge device 118 interfaces with MPLS 108 and PBBN 110.

The various header fields that are added or removed as the frame is transferred from network to network are indicated above each network. One or more of customer network 102, PBN 104, PBBN 106, MPLS 108, PBBN 110, PBN 112, and customer network 114 may be operated by different carriers or providers. In system 100, the header fields are shown for the case in which PBBN 106 and PBBN 110 are operated by different PBBN carriers. The header fields are more fully described below.

The frame of an ingress PBT Trunk can be mapped to services such as VPLS (Virtual Private LAN Service), EVPL (Ethernet Virtual Private Line), egress PBT trunks, connection to a Private IP network, connection to a Public IP Network (i.e., Internet), etc. In some embodiments, an ingress mapping of PBT trunk frames to services and an egress mapping of service frames to PBT trunks is performed. A service, as used herein, can be any appropriate service, including but not limited to, a set of egress PBT trunks, VPLS instances, EVPL, Private IP network, Public IP network, or other services. For example, the traffic from a same customer can be unbundled into two VPLS services, e.g., one for VoIP and one for video, a set of EVPLs, and a connection to the Internet.

System 100 shows an example of mapping from a PBT frame to a service. As shown, provider edge (PE) device 116 receives PBT frame 120 and maps it to an MPLS pseudowire (PW) service. PE device 116 then formats PBT frame 120 into service frame 122 and transfers service frame 122 to MPLS network 108. Service frame 122 contains a Pseudowire and LSP tunnel labels as shown. At the egress of MPLS network 108, service frame 124 (which may or may not be identical to service frame 122) is received at PE device 118, which maps it to PBT trunk B. PE device 118 then formats service frame 124 into PBT frame 126. For example, if PBBN 106 and PBBN 110 are associated with different carriers, then the I-SID field may be different.

In the above example, the whole traffic of a PBB-TE trunk is sent over a single Pseudowire/LSP tunnel, which may not be the case. The PBB-TE trunk 120 may carry traffic from several customers. This traffic is identified by different I-SID values. PE 116 may send traffic from different I-SID values to different Pseudowires and LSP tunnels. This may be required in order to send different customers to different destinations over the MPLS network.

Figure 2:
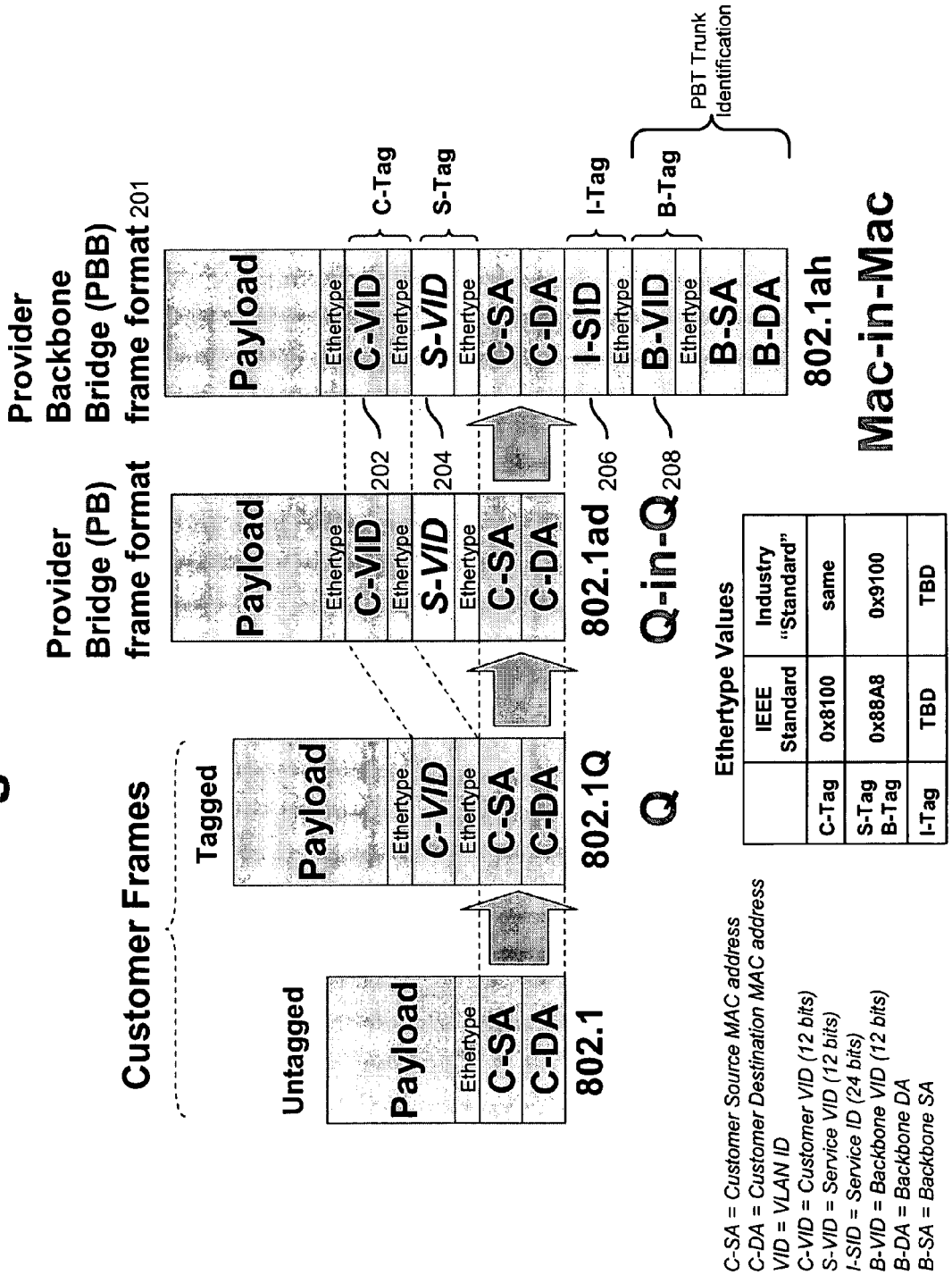
FIG. 2 is a diagram illustrating an example of the header fields that are added to a data frame when going from customer network 102 to PBN 104 to PBBN 106 according to IEEE 802.1, IEEE 802.1Q, IEEE 802.1ad, and IEEE 802.1ah.

FIG. 2 is a diagram illustrating an example of the header fields that are added to a data frame when going from customer network 102 to PBN 104 to PBBN 106 according to IEEE 802.1, IEEE 802.1Q, IEEE 802.1ad, and IEEE 802.1ah. PBB frame format 201 includes C-VID (Customer VLAN ID) 202, S-VID (Service VLAN ID) 204, I-SID (Service instance ID) 206, and B-VID (Backbone VLAN ID) 208. In some embodiments, PBB frame format 201 includes a pseudowire ID or label (PW ID) field (not shown). The value or identifier contained in B-VID 208 is used to determine whether the PBB frame is a PBT frame. In some cases, one or more of C-VID 202, S-VID 204, a PW ID, and I-SID 206 can be used to determine with which service a PBT frame is associated.

As used herein, C-VID 202, S-VID 204, I-SID 206, PW ID, and B-VID 208, are referred to as location specific identifiers because they are not necessarily universal across all networks, and may be different depending on, for example, which carrier is operating a network. For example, I-SID values may not be coordinated between different carriers.

Figure 8:
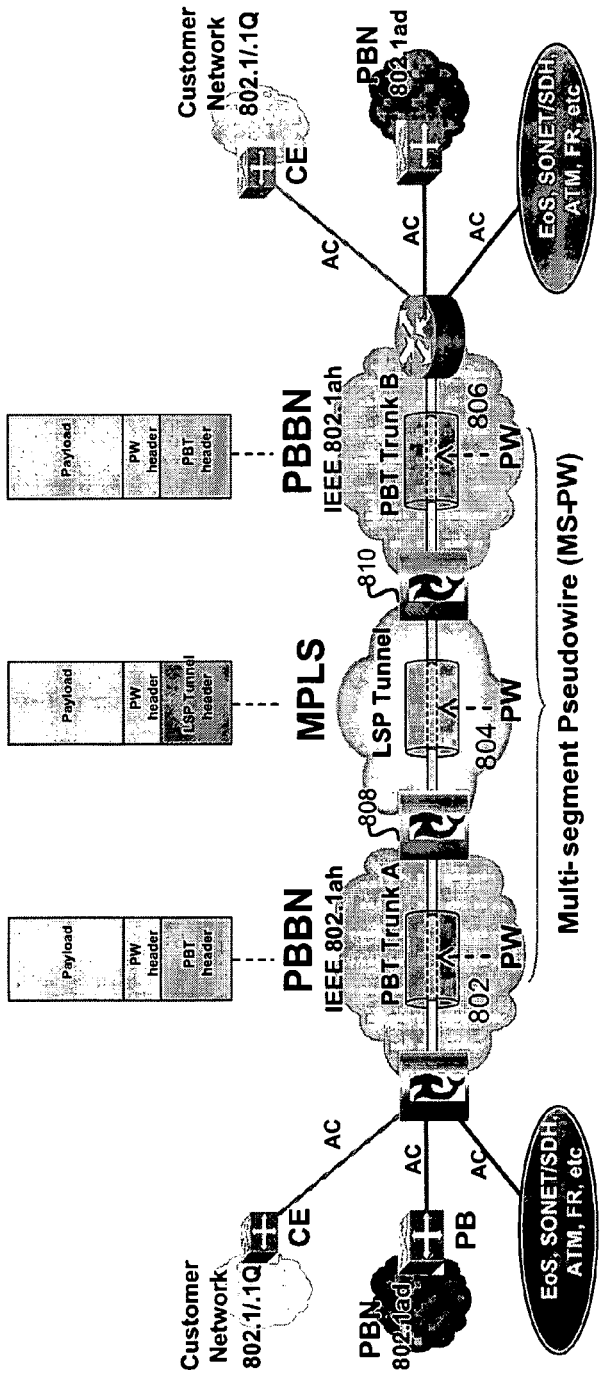
FIG. 8 is a block diagram illustrating an example of a PBBN network interfacing with an MPLS network interfacing with another PBBN network.

In FIG. 2, PW ID is not shown. Any of the frames in FIG. 2 can be encapsulated in a Pseudowire by adding a DA, SA, LSP, PW header as shown in 606 of FIG. 6. However, this is not the PW ID that is a location specific identifier when mapping a PBB-TE payload to a service, since a frame encapsulated in a PW is no longer a PBB-TE frame. The PW ID that is a location specific identifier is shown in FIG. 8. In FIG. 8, ATM traffic is encapsulated in a PW. That PW is then sent inside a PBB-TE trunk, as more fully described below. There can be a PW ID inside the PBB-TE frame to identify the traffic.

Figure 3:
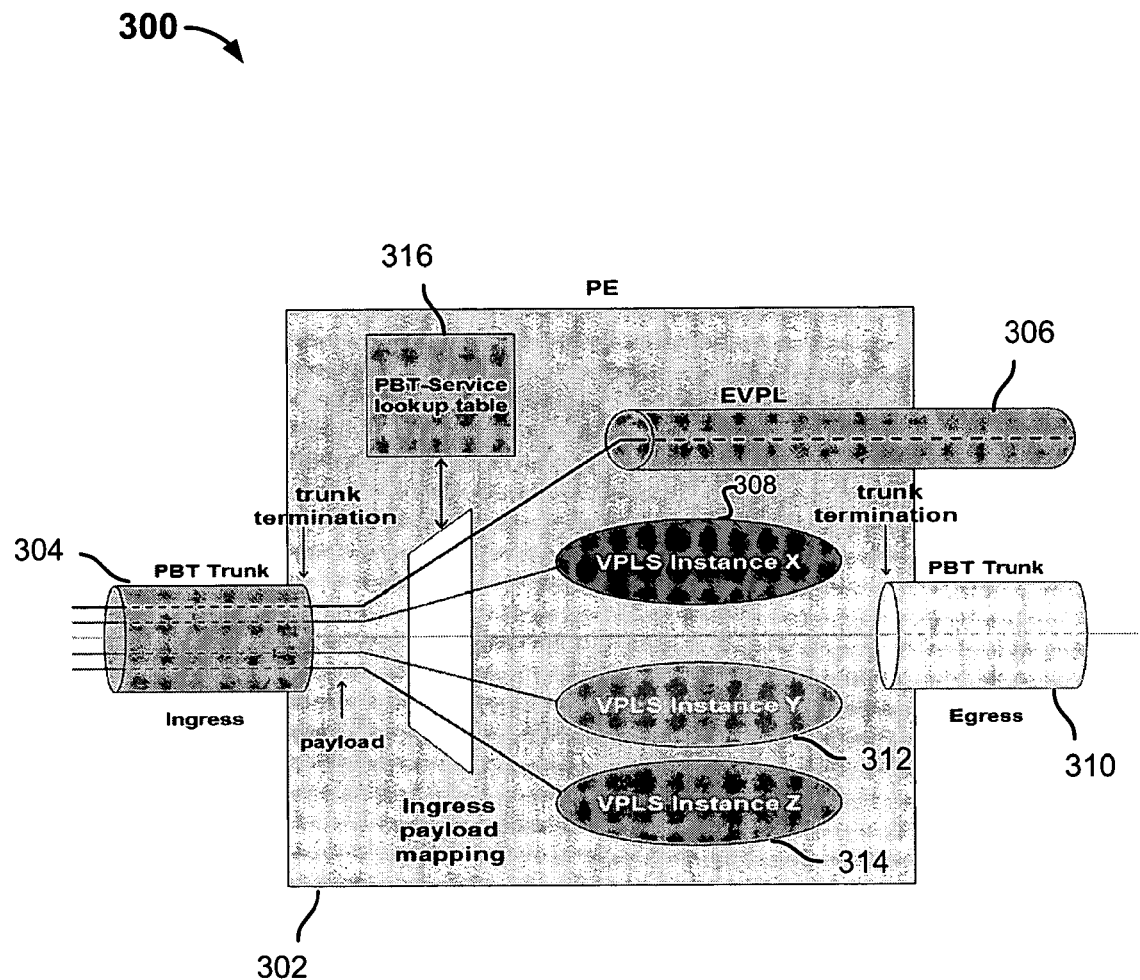
FIG. 3 is a diagram illustrating an example of a provider edge between a PBT trunk and various networks associated with different services.

FIG. 3 is a diagram illustrating an example of a provider edge between a PBT trunk and various networks associated with different services. In the example shown, PBT trunk 304 is terminated at PE device 302, which is coupled to networks associated with EVPL 306, VPLS instances 308, 312, and 314, and PBT trunk 310. Traffic received by PE device 302 via PBT trunk 304 is mapped to EVPL 306, VPLS instance 308, 312, or 314, or PBT trunk 310. The mapping is performed using PBT-service lookup table 316, which may be manually or automatically provisioned by a service provider and/or customer. In some embodiments, provisioning a service lookup table includes setting or programming the table, as opposed to the information in the service lookup table being obtained by some learning process (e.g., based on received frames). For example, a service provider with an understanding of the services, available headers, the values of those headers set by the user of the network, etc. may program service lookup table 316. In some embodiments, PE device 302 serves as a gateway between Ethernet and MPLS.

In some embodiments, the payload of the PBT trunk is retrieved. The original Ethernet frames that were encapsulated with the IEEE 802.1ah header comprise the PBT trunk payload. That is, the PBT trunk payload is obtained by removing the IEEE 802.1ah header and exposing the original Ethernet frame, which contains Customer MAC addresses, i.e., C-DA for Customer destination MAC address and C-SA for Customer source address. In the case of VPLS mapping, VPLS forwards mapped PBT Trunk frames based on Customer MAC addresses. In the context of other services, e.g., EVPL, the mapped PBT trunk frame is forwarded by the usual EVPL mechanisms.

In some embodiments, this feature is used to separate customer traffic according to the customer application or service, e.g., VoIP, video, Internet traffic, etc. For example, a certain customer VLAN can be mapped to a VPLS service exclusively for VoIP, another can be mapped to an EVPL service, and another to the Internet or a Private IP network.

FIG. 4 is an example of a PBT-service lookup table. PBT-service lookup table 400 is an example of PBT-service lookup table 316. As shown, PBT-service lookup table 400 includes columns for location specific identifiers I-SID, C-VID, S-VID, PW ID, and a column for Service. Services include VPLS, EVPL, PBT, and other services supported by MPLS. A service may be point to point (e.g., EVPL, PBT), point to multipoint (e.g., E-TREE), or multipoint to multipoint (e.g., E-LAN). In some embodiments, the services are not associated with Layer 2 technology. When a PBT frame is received, its I-SID (if present), C-VID (if present), S-VID (if present), and PW ID (if present) are identified and PBT-service lookup table 400 is used to identify with which service the PBT frame is associated. For example, a PBT frame with I-SID 101 and C-VID 10 is mapped to service EVPL (Ethernet Virtual Private Line) 7, which is an instance of EVPL. As shown, two PBT-frames with the same I-SID do not necessarily map to the same service. For example, a given customer with a particular I-SID may have traffic to send to a VPLS and a PBT (as shown) or an EVPL. In this example, PBT-service lookup table 400 includes wildcard values, indicated by an asterisk (*). In various embodiments, the lookup schemes may be first match or longest match.

In some embodiments, lookup table 400 is configured statically and provisioned by a service provider. In some embodiments, lookup table 400 is automatically provisioned. Automated provisioning may be driven by a customer. For example, the table could be automatically updated in response to receiving an indication that a customer has bought a new service.

In different embodiments, the PBT-service lookup table may include different location specific identifiers. For example, another embodiment of a PBT-service lookup table may include: PBT trunk identification {B-DA, B-SA, B-VID} where B-DA may be optional (i.e., use wildcard for B-DA); I-SID; and C-VID. The fields I-SID and C-VID in this table may be populated with wildcard values, i.e., "don't care" values indicating that any given value is a match for that field or it is acceptable if the field is not available. The following are examples of possible PBT-Service lookup table row configurations:

A) PBT trunk ID, I-SID, *, Service X: Means that all the traffic from the specified PBT trunk with the given I-SID maps to Service X irrespective of the C-VID value. Service X can be, for example, the identification of a VPLS Instance or an EVPL.

B) PBT trunk ID, I-SID, C-VID, Service Y: Means that all the traffic from the specified PBT trunk with the given I-SID and C-VID maps to Service Y.

C) PBT trunk ID, *, *, Service Z: Means that all the traffic from the specified PBT trunk maps to Service Z irrespective of I-SID and C-VID values.

D) PBT trunk ID, *, C-VID, Service W: Means that all the traffic from the specified PBT trunk with the given C-VID maps to Service W irrespective of the I-SID value.

In some embodiments, when preparing a lookup key (i.e., PBT trunk ID, I-SID, C-VID) for a PBT trunk frame, if the frame does not carry an I-SID value, a default (provisioned) value is assigned to the I-SID field of the lookup key. Similarly, if the frame does not have a C-VID value, a default (provisioned) value may be assigned to the C-VID field of the lookup key.

The lookup key and PBT-Service lookup table can be extended to include the S-VID field (from the 802.1ad tag) and P-bits (from either the 802.1ag or 802.1Q tags) to determine the mapping of PBT trunk frame to services. In cases where the I-SID field is enough to globally identify customers, the S-VID field may not be required. The use of the P-bits field to further qualify a service may be desirable to some service providers.

The lookup search can be based on first match or longest match. With first match, starting at the first row in the PBT-Service table, each row in sequence is compared to the lookup key. If there is a match, the lookup is successful and the result is the (first) matching row. With longest match, the whole table needs to be searched, since the matching row is the one with the largest number non-wildcard bits that matches the lookup key. If no matching row is found, the frame is not mapped to any service and should be dropped.

A given implementation may never need to match an I-SID or a C-VID or both to select a service. The PBT-Service lookup table may be employed without one or both of these fields.

Some rows of the PBT-Service table may be provisioned while others may be populated dynamically by means of a management system and control plane.

At the egress from a service to a PBT trunk, the mapping is from service to PBT Trunk ID. Therefore, many different services (e.g., VPLS Instances and EVPL instances) may send traffic to a same PBT trunk. The mapping from service to PBT trunk also specifies a complete set of IEEE 802.1ah fields to be used when encapsulating the frame into the PBT trunk. The egress mapping may be provisioned or configured dynamically by means of a management system and control plane.

Figure 5:
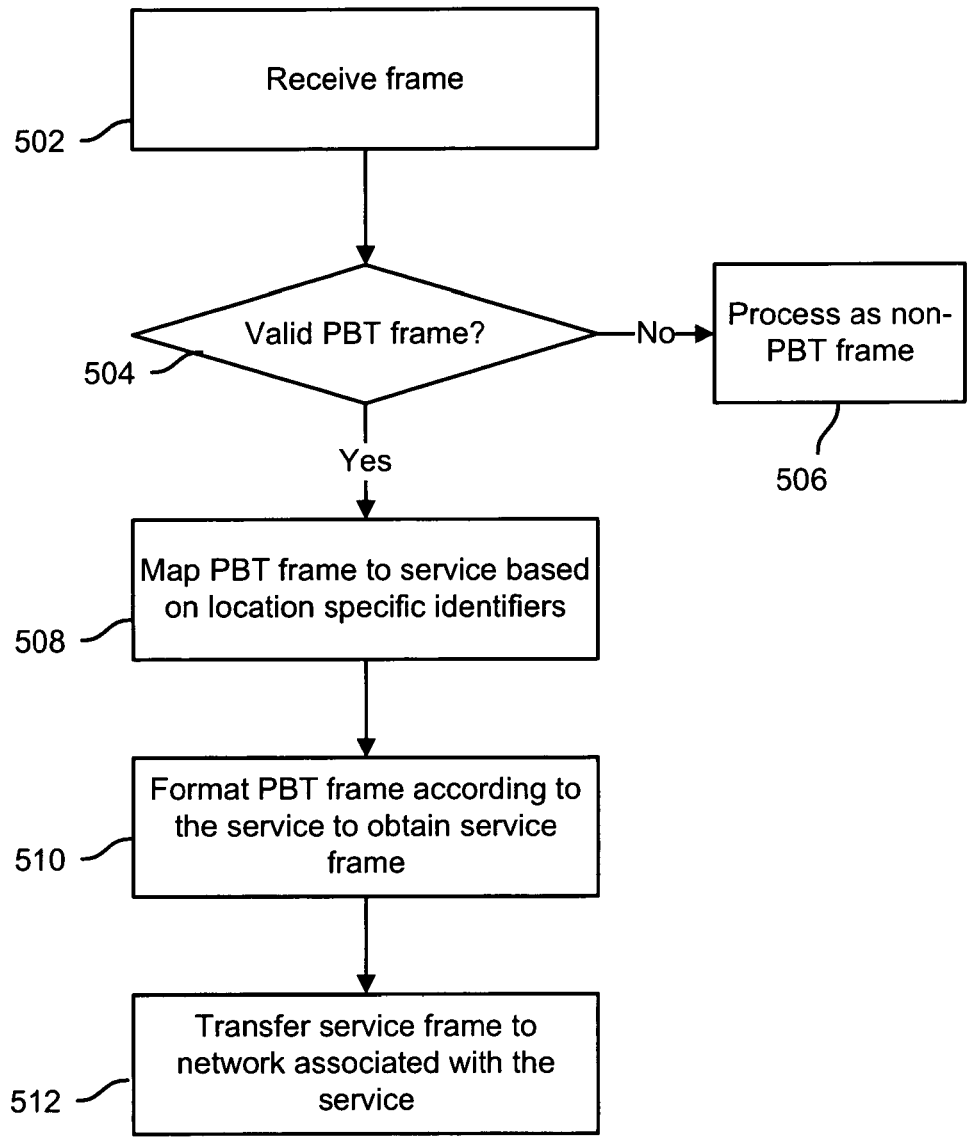
FIG. 5 is a flow chart illustrating an embodiment of a process for transferring a frame.

FIG. 5 is a flow chart illustrating an embodiment of a process for transferring a frame. For example, this process may be performed by a PE device, such as PE device 116 or 302. At 502, a frame is received from a PBBN. At 504, it is determined whether the frame is a valid PBT frame. For example, the B-DA, B-SA (optionally), and B-VID are used to determine this. If it is not a valid PBT frame, the frame is processed as a non-PBT frame. For example, the frame may be a regular 802.1Q frame to be switched according to its destination MAC address and B-VID. At 508, the PBT frame is mapped to a service based on location specific identifiers. For example, the PBT frame may be mapped to a service using a PBT-Service lookup table, such as PBT-Service lookup table 400. In some embodiments, any combination of one or more location specific identifiers may be used to map the PBT frame. In some cases, I-SID in addition to other location specific identifiers is required to identify a service.

At 510, the PBT frame is formatted according to the service to obtain a service frame. Formatting may include removing and/or adding to the PBT frame. For example, in system 100, a portion of PBT frame 120 is removed and the remainder is encapsulated with an MPLS PW/LSP header (PWE, LSP, SA, and DA) to obtain service frame 122. Other examples of formatting the PBT frame are more fully described below.

At 512, the frame is transferred to a network associated with the service. For example, in system 100, service frame 122 is transferred to MPLS network 108. Other examples are more fully described below.

Figure 6:
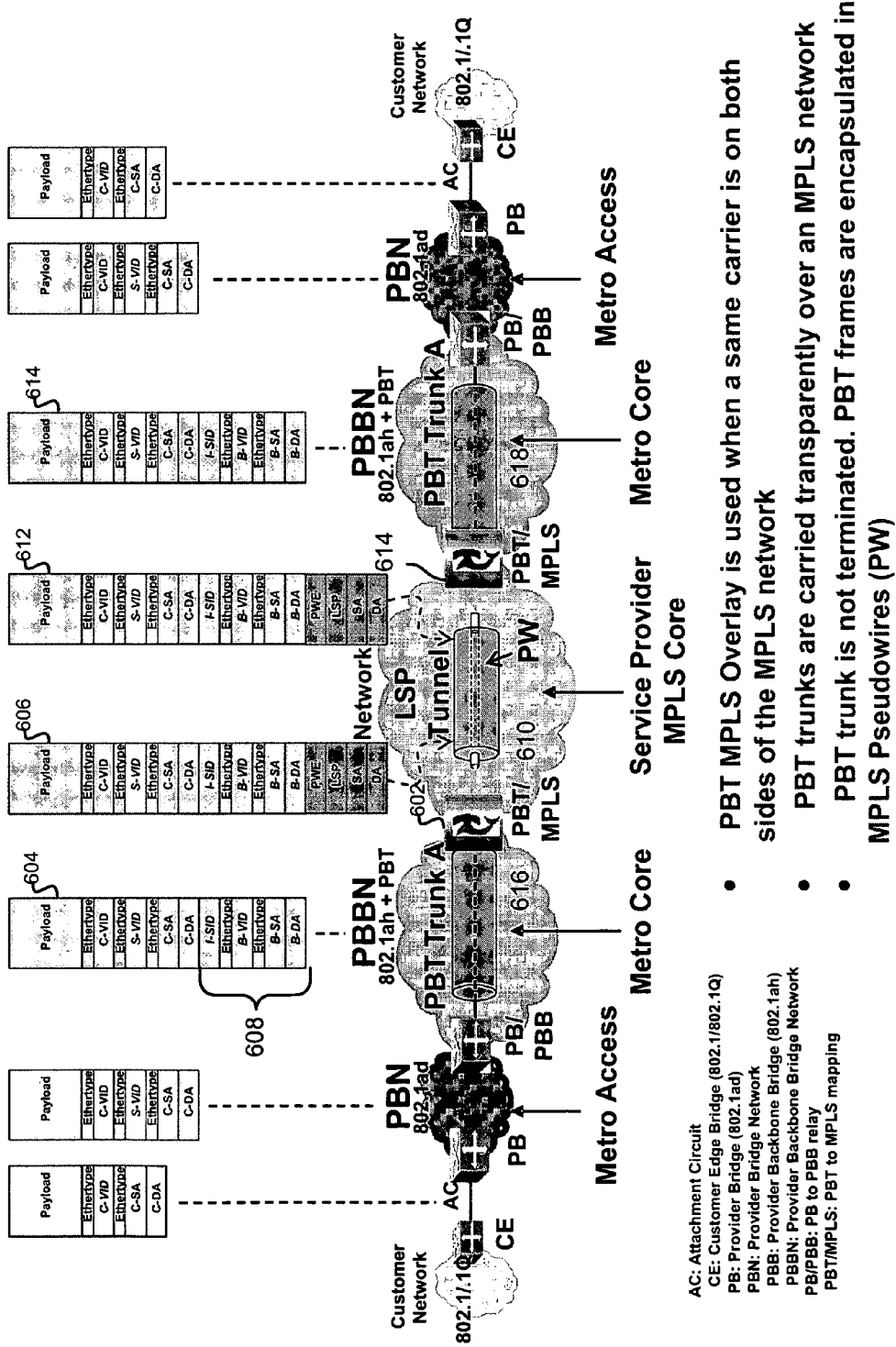
FIG. 6 is a diagram illustrating an example of a PBBN network interfacing with an MPLS network.

FIG. 6 is a diagram illustrating an example of a PBBN network interfacing with an MPLS network. In this example, PE device 602 receives PBT frame 604 and based on the location specific identifiers, maps PBT frame 604 to service frame 606. In this example, service frame 606 is obtained by encapsulating PBT frame 604 with an MPLS PW/LSP header (PWE, LSP, SA, and DA). In this example, PBBN 616 and PBBN 618 are operated by the same carrier, so PBT header 608 is the same in PBBN 616 and PBBN 618 and does not need to be removed from PBT frame 604. At the egress of MPLS network 610, service frame 612 is received by PE device 614. PE device 614 strips the MPLS PW header from service frame 612 to obtain PBT frame 614, which is identical to PBT frame 604.

Figure 7:
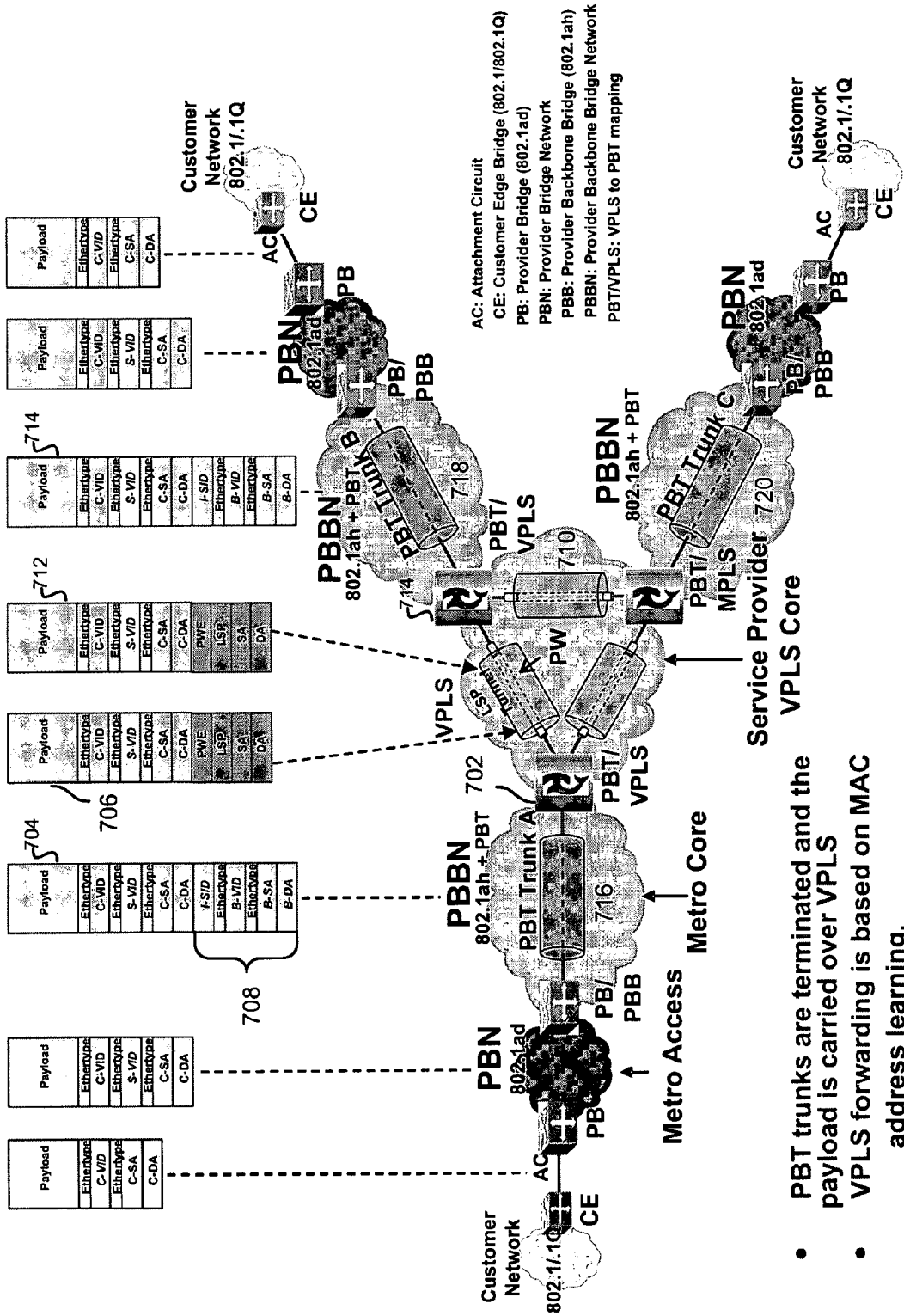
FIG. 7 is a diagram illustrating an example of a PBBN network interfacing with a VPLS network.

FIG. 7 is a diagram illustrating an example of a PBBN network interfacing with a VPLS network. In this example, PE device 702 receives PBT frame 704 and based on the location specific identifiers, maps PBT frame 704 to service frame 706. In this example, service frame 706 is obtained by removing PBT header 708 and encapsulating the remainder of PBT frame 704 with an MPLS PW/LSP header (PWE, LSP, SA, and DA). At the egress of VPLS network 710, service frame 712 is received by PE device 714. PE device 714 strips the MPLS PW header from service frame 712 to obtain PBT frame 714. As shown, traffic received at PE device 702 from PBBN 716 can be split between PBBN 718 and PBBN 720. Although one VPLS network is shown, in various embodiments, there could be multiple VPLS networks for each customer.

FIG. 8 is a block diagram illustrating an example of a PBBN network interfacing with an MPLS network interfacing with another PBBN network. In this example, PBBT trunks A and B carry traffic encapsulated by Pseudowires. Since these Pseudowires are encapsulated directly in a PBB-TE trunk and without an MPLS LSP tunnel, these are called 'Dry Martini" Pseudowires. PE 808 receives PBB-TE frames and maps the PBB-TE Pseudowire, based on the PW ID, to MPLS Pseudowires. PE 810 conversely maps MPLS Pseudowires to PBB-TE Pseudowires.

FIG. 8 illustrates the case where a PW ID is used as a location specific service identifier and is used in the mapping tables at the PEs between the PBBN and MPLS networks. The payload of the PBB-TE trunk is a Pseudowire in this case.

Figure 9:
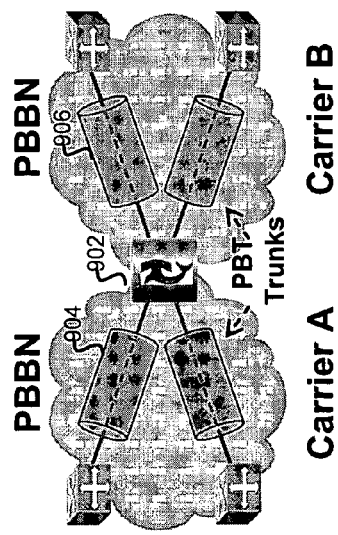
FIG. 9 is a block diagram illustrating an example of a PBBN network interfacing with another PBBN network.

FIG. 9 is a block diagram illustrating an example of a PBBN network interfacing with another PBBN network. In this example, each PBBT trunk is a service. The I-SID may be changed by PE device 902 in going from one PBT trunk to another PBT trunk. For example, PE device 902 receives a PBT frame from PBT trunk 904. Using a PBT-service lookup table, PE device 902 maps the PBT frame to PBT trunk 906 and formats the PBT frame by modifying its I-SID to an appropriate I-SID for PBT trunk 906 to obtain a service frame. The service frame is transferred to PBT trunk 906.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   identifying, by a provider edge device configured to transfer data between a provider backbone bridge network and a multiprotocol label switching network, a service instance identifier and a customer virtual local area network identifier specified in a frame;
   determining, by the provider edge device, a service associated with the frame based at least in part on service mapping data that defines associations between available services, including the service, and corresponding combinations of values of the service instance identifier and the customer virtual local area network identifier; and
   formatting, by the provider edge device, the frame according to the service to obtain a service frame.

2. The method of claim 1, further comprising transferring, by the provider edge device, the service frame to a network device of a network associated with the service.

3. The method of claim 2, wherein the transferring comprises transferring the service frame to a multi-protocol label switching network that interfaces with the provider edge device.

4. The method of claim 1, further comprises identifying, by the provider edge device, at least one of a service virtual local area network identifier or a pseudowire identifier specified in the frame,
   wherein the determining comprises determining the service further based on at least one of the service virtual local area network identifier or the pseudowire identifier.

5. The method of claim 1, further comprising receiving the frame at the provider edge device from at least one of a provider backbone bridge network device or a provider backbone transport trunk device.

6. The method of claim 1, wherein the determining the service comprises determining at least one of a virtual private local area network service, an Ethernet virtual private line, a provider backbone transport trunk service, a private internet protocol network service, or a public protocol network service.

7. The method of claim 1, further comprising identifying, by the provider edge device, a provider backbone transport trunk identifier specified in the frame, wherein the provider backbone transport trunk identifier comprises at least one of a backbone destination address, a backbone source address, or a backbone virtual local area network identifier.

8. The method of claim 1, further comprising updating the service mapping data in response to receiving update data defining a change of service associated with a customer identifier.

9. A provider edge device, comprising:
   a memory that stores computer-executable instructions; and
   a processor, communicatively coupled to the memory, that executes or facilitates execution of the computer-executable instructions to at least:
      identify a service instance identifiers and a customer virtual local area network identifier in a frame;
      identify a service associated with the frame based on service mapping data that defines mappings between available services, including the service, and corresponding combinations of values of the service instance identifier and the customer virtual local area network identifier;
      format the frame according to the service to obtain a service frame; and
      transfer the service frame between a provider backbone bridge network device and a multiprotocol label switching network device.

10. The provider edge device of claim 9, wherein the multiprotocol label switching network device is associated with the service.

11. The provider edge device of claim 9, wherein the processor further executes or facilitated the execution of the computer-executable instructions to:
   identify at least one of a service virtual local area network identifier or a pseudowire identifier in the frame; and
   identify the service further based on at least one of the service virtual local area network identifier or the pseudowire identifier.

12. The provider edge device of claim 9, wherein the processor further executes or facilitates the execution of the computer-executable instructions to receive the frame from at least one of a provider backbone bridge network device or a provider backbone transport trunk device.

13. The provider edge device of claim 9, wherein the service comprises at least one of a virtual private local area network service, an Ethernet virtual private line, a provider backbone transport trunk service, a private internet protocol network service, or a public protocol network service.

14. The provider edge device of claim 9, wherein the processor further executes or facilitates the execution of the computer-executable instructions to:
  identify, in the frame, at least a provider backbone transport trunk identifier comprising at least one of a backbone destination address, a backbone source address, or a backbone virtual local network identifier; and
  identify the service further based on the provider backbone transport trunk identifier.

15. The provider edge device of claim 9, wherein the processor further executes or facilitates the execution of the computer-executable instructions to modify the service mapping data in response to receipt of update information specifying a change of service associated with a customer identifier.

16. The provider edge device of claim 9, wherein the processor further executes or facilitates the execution of the computer-executable instructions to transfer the service frame to a multi-protocol label switching network device that interfaces with the provider edge device.

17. A computer-readable storage device having stored thereon computer-executable instructions that, in response to execution, cause a provider edge device comprising a processor to perform operations, comprising:
  determining a service instance identifier and a customer virtual local area network identifier in a frame received by the provider edge device from a provider backbone bridge network device;
  determining a service associated with the frame based at least in part on service mapping data that defines an association between available services, including the service, and respective combinations of values of the service instance identifier and the customer virtual local area network identifier;
  formatting the frame according to the service to obtain a service frame; and
  sending the service frame to a multiprotocol label switching network device.

18. The computer-readable storage device of claim 17, wherein the multiprotocol label switching network device is associated with the service.

19. The computer-readable storage device of claim 17, wherein the operations further comprise:
  determining at least one of a service virtual local area network identifier or a pseudowire identifier in the frame; and
  determining the service further based on at least one of the service virtual local area network identifier or the pseudowire identifier.

20. The computer-readable storage device of claim 17, wherein the service comprises at least one of a virtual private local area network service, an Ethernet virtual private line, a provider backbone transport trunk service, a private internet protocol network service, or a public protocol network service.

* * * * *